United States Patent [19]

Nelson

[11] 4,114,445

[45] Sep. 19, 1978

[54] ELECTRICAL THERMOSTAT CONTROL APPARATUS

[75] Inventor: Marvin D. Nelson, St. Louis Park, Minn.

[73] Assignee: Honeywell Inc., Minneapolis, Minn.

[21] Appl. No.: 798,214

[22] Filed: May 18, 1977

[51] Int. Cl.² .......... G01K 7/14

[52] U.S. Cl. .......... 73/360; 73/362.4; 73/362.7; 338/128; 338/131

[58] Field of Search .......... 73/360, 362 R, 362 AR, 73/362.4, 362.6, 362.7; 338/128, 131, 134, 135, 160, 162

[56] References Cited

U.S. PATENT DOCUMENTS

| | | | |
|---|---|---|---|
| 1,578,988 | 3/1926 | Hardy | 338/134 |
| 1,643,105 | 9/1927 | Wiegand | 338/131 |
| 2,159,513 | 5/1939 | Taylor | 338/130 X |
| 2,197,312 | 4/1940 | Nelson | 338/116 X |
| 2,248,672 | 7/1941 | Holmes | 338/131 X |
| 2,277,883 | 3/1942 | Rich | 338/131 X |
| 2,551,989 | 5/1951 | Wilson | 338/130 |
| 2,572,293 | 10/1951 | Wilson et al. | 236/91 R |
| 2,626,379 | 1/1953 | Michells | 338/135 X |
| 2,778,907 | 1/1957 | Hamren | 338/135 X |
| 2,876,318 | 3/1959 | Stratton | 338/135 X |
| 3,208,299 | 9/1965 | Leonard et al. | 338/130 X |
| 3,284,752 | 11/1966 | Bellar | 338/131 |
| 3,307,133 | 2/1967 | Wolff | 338/194 |
| 3,497,856 | 2/1970 | Schell | 338/162 |
| 3,501,733 | 3/1970 | Lemon | 338/131 |
| 3,597,717 | 8/1971 | Kent | 338/131 |
| 3,859,618 | 1/1975 | Nishiolea et al. | 338/128 |

*Primary Examiner*—Charles Gorenstein
*Attorney, Agent, or Firm*—Clyde C. Blinn

[57] ABSTRACT

A thermostat adapted for use in an electrical control system for controlling temperature conditioning apparatus has at least two circuit adjusting members or potentiometers comprising a resistance circuit board mounted on a base and a pair of pivotally mounted wiper supporting members for cooperating with the resistance circuit. Each of the members are pivoted on the same pivot and the first member has an open area through which the wiper of the second member mounted adjacent thereto protrudes to cooperate with the electrical circuit board to provide a compact unit. A pair of adjusting members are horizontally movably attached to the base to cooperate with the ends of the pivotal selector members to provide for pivotal movement of the selector members upon straight line movement of the adjusting member.

8 Claims, 6 Drawing Figures

Figure 2:
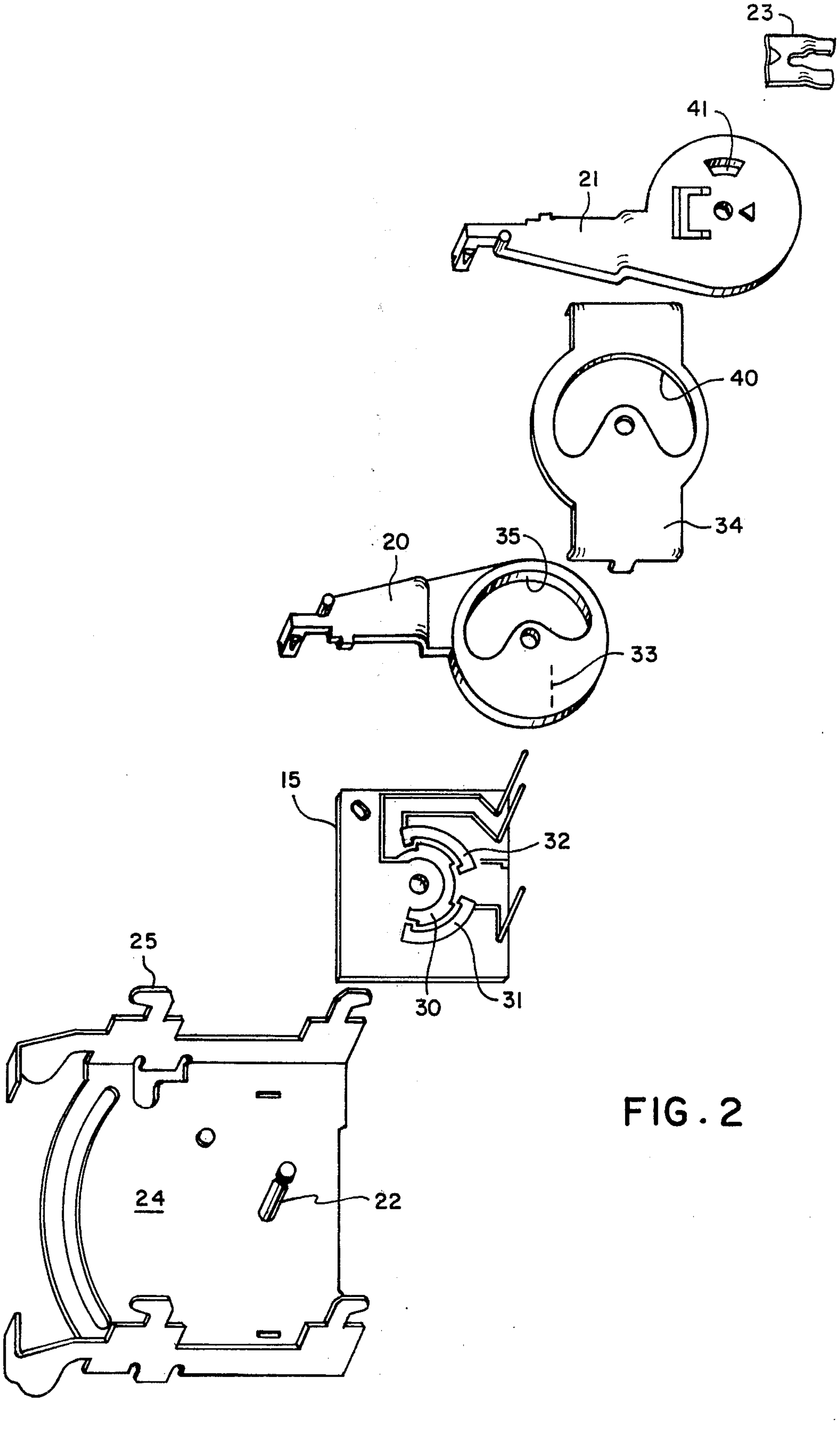

FIG. 1
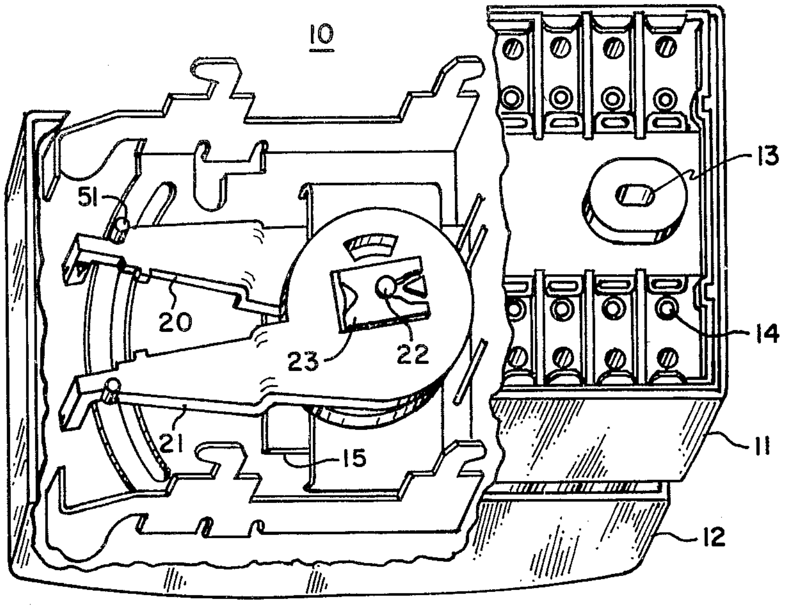
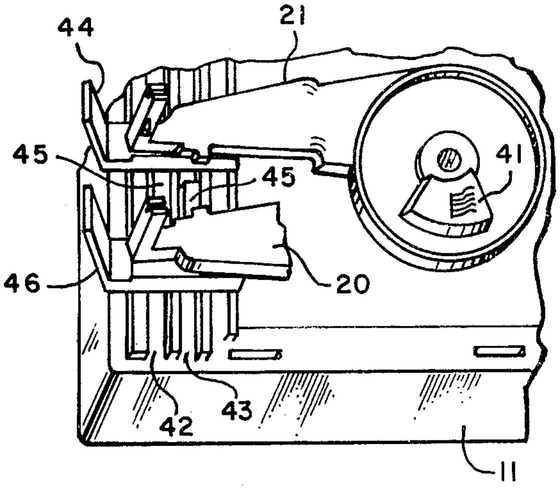
FIG. 3
FIG. 4
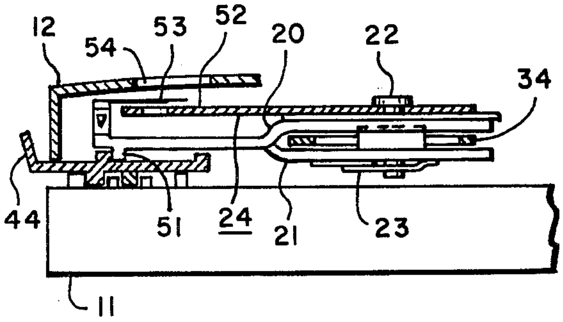
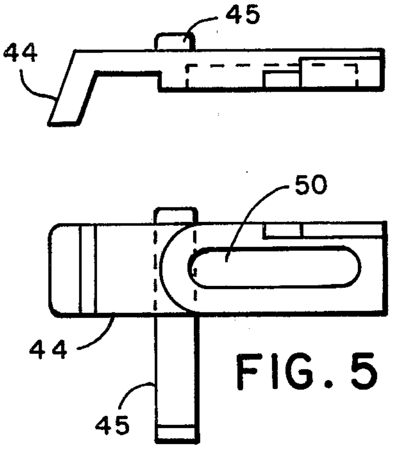
FIG. 5
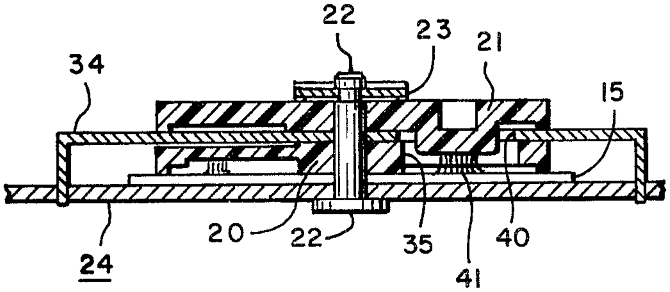
FIG. 6

ELECTRICAL THERMOSTAT CONTROL APPARATUS

BACKGROUND AND SUMMARY OF THE INVENTION

While electronic temperature control systems using electrical temperature sensing resistors for sensing the space temperature and potentiometers in the electrical circuit for adjusting the temperature setpoint and thus the temperature to be controlled in the space, are very old such as shown in the John M. Wilson et al. U.S. Pat. No. 2,572,293 issued Oct. 23, 1951, there is a continual need for a more compact and less expensive control thermostat apparatus.

The thermostat of this invention provides for an electrical circuit board mounted on a base having a pair of potentiometer wipers associated with the circuit board. The wipers are attached to selector members which are pivotally attached to the base in a compact unit. Specifically, the first selector member carries a wiper and has an opening so that upon the mounting of a second selector member thereupon on the same pivotal support, the wiper of the second selector member can be associated with the circuit board through the opening in the first selector member. While an indicator scale in the base of the thermostat can cooperate with pointers associated with the selector members, the movement of the selector members is an arcuate motion. To provide for selection of the setpoint on the thermostat, adjusting members are mounted on the base for straight line motion and cooperate with the ends of the selector members to provide for the pivotal motion of the selector members.

Further details of the invention are described in the specification of which

FIG. 1 is a cutaway view of the back side of the thermostat showing the selector members, FIG. 2 is an exploded view of the assembly, FIG. 3 is a more detailed view of one selector member when associated with the adjusting member, FIG. 4 is a cross-sectional view of the thermostat of FIG. 1, FIG. 5 is a detailed view of the adjusting member, and FIG. 6 is a more detailed view of the electrical circuit and potentiometer.

DESCRIPTION OF THE INVENTION

Referring to FIG. 1, a thermostat 10 has a base 11 and a front cover 12. Base 11 contains the electrical components including the temperature responsive resistance element for sensing the space temperature so that upon the connection of the resistance element into an electrical control system, a remote temperature conditioning apparatus can be operated to maintain a selected temperature in the space in which the thermostat is mounted. Such an electrical control system might be shown in the mentioned John M. Wilson et al patent. Base 11 has a hole 13 for a screw for mounting the base on a wall in the space and a plurality of terminals such as terminal 14 for connecting the electrical circuit of the thermostat to an electrical control system. A part of the thermostat is the temperature selecting or setpoint adjustment circuit which is contained on a circuit board 15 mounted in the base 11 of the thermostat. Associated with the circuit board are potentiometer wipers or circuit adjusting members positioned by selector members 20 and 21 which are pivotally supported on the base by a pivot 22. Members 20 and 21 are held on the pivot by a conventional connecting clip 23.

Referring to FIG. 2, an exploded view of the unit is shown. Bracket 24 is connected to the base 11 by a plurality of tabs 25 to provide the support for pivot 22. Mounted on the bracket 24 is circuit board 15 which has the plurality of electrical circuit components 30, 31 and 32 which are connected to output terminals 14 on the base by means of the conductors shown. The first selector member 20 contains a wiper 33 for cooperating with electrical members 30 and 31 so the output between the circuit connectors has a resistance depending upon the position of the shorting wiper 33. A support bracket or base extension 34 is mounted on bracket 24 to provide a spacing between selector member 20 and a second selector member 21. Bracket 34 provides support and prevents mechanical interaction between members 20 and 21. A portion of selector member 20 shown at 35 is removed as well as a portion of bracket 34, in alignment with portion 35, shown at 40, so that when selector member 21 is mounted on the pivot 22 its wiper 41 can cooperate with the electrical members 30 and 32 to provide an output depending upon the position of this wiper. When the selector members are assembled in position, clip 23 holds the assembled unit.

While the adjustment of selector members 20 and 21 can be made with cover 12 of the thermostat removed from the base 11, the adjustment of the selector members with the cover in place may be desired. As shown in FIG. 3, base 11 has a plurality of straight grooves 42 and 43. Associated with the selector member 21 is an adjusting lever 44 containing a foot 45 slidably cooperating with groove 42. Adjusting member 44 shown in detail in FIG. 5 has a groove 50 running perpendicular to foot 45 which cooperates with a foot 51 on selector member 20. Upon a linear movement of adjusting member 44 in a direction in line with the side of base 11, a pivotal movement of selector member 20 is provided. A similar arrangement is provided for selector member 20 with a selector member 46 carried in groove 43 so that when the selector members 20 and 21 are used for the separate adjustment of heating and cooling control point settings, the adjustment can be provided for the use of adjusting members 44 and 46. Adjusting members 44 and 46 can be easily removed by flexing levers 20 and 21 away from the base if no external adjustment of the thermostat is devised when the cover is in place.

Bracket 24 has associated on its front surface at 52 an index for selecting the temperature setting of the thermostat by means of a scale pointer 53 which is positioned by the selector member. The position of setpoint indicator 53 with respect to scale 52 can be observed through the opening 54 in the cover.

With the present invention, a compact unit for the electrical circuit portion of the thermostat is provided which not only reduces the size of the thermostat but the assembly of the unit is much easier to reduce the overall costs of production. These and other aspects of the present invention are described in the appended claims.

The embodiments of the invention in which an exclusive property or right is claimed are defined as follows:

1. In a temperature sensing unit adapted for use in an electrical control system for temperature conditioning apparatus comprising;

a base member (adapted to be mounted on a surface.)

an electrical circuit having a plurality of circuit components associated with a temperature responsive means for changing the operation of the temperature conditioning apparatus, said circuit components being mounted on said base, a first selector member movably mounted on said base for movement in a plane parallel to said base and cooperating with one of said plurality of components, said selector member having an open portion laying over a second of said plurality of circuit components, and second selector member movably mounted on said base for movement in a second plane parallel to and adjacent said first selector member and cooperating with said second plurality of circuit components through said open portion to provide a compact selector member assembly.

2. The invention of claim 1 wherein said electrical circuit is a variable resistance circuit and each of said plurality of circuit components is at least one electrical resistance with a conductor mounted adjacent thereto, said first selector member has a wiper for electrically connecting said resistance and said conductor of one of said plurality of components whereby upon movement of said selector member an output of said electrical resistance changes, and said second selector member has a wiper positioned through said open portion for electrically connecting said resistance and said conductor of a second of said plurality of components whereby upon movement of said second selector member an output of said second electrical resistance changes.

3. The invention of claim 2 wherein, said first and second selector members are pivotally mounted adjacent each other on a pivot attached to said base member whereby upon movement of said second member said wiper moves in an arcuate movement through said open portion of said first member.

4. The invention of claim 3 comprising a base extension member spaced adjacent and connected to said base and in between said first and second members for supporting said pivot and spacing said first and second selector members to prevent mechanical interaction therebetween, said base extension having an open portion in alignment with said open portion of said first member to allow said wiper of said second member to engage said second component.

5. The invention of claim 1 wherein, said first selector member is pivotally mounted on said base and said second selector member is pivotally mounted on said base and comprising adjusting members attached to each of said first and second selector members, and at least one straight guide groove adjacent a side of said base for receiving said adjusting members whereby each of said adjusting members can be moved in a straight line manner to provide for pivotal movement of each of said selector members.

6. The invention of claim 5 comprising a temperature setpoint scale attached to said base, and indicator means associated with said adjusting members to cooperate with said scale to indicate the temperature setpoint of said selector members.

7. The invention of claim 4 comprising adjusting members mounted in at least one straight groove in said base to provide a straight line movement of adjusting members, each of said adjusting members having a foot member slidable in said groove, said adjusting members each have a groove opposite said foot member and at right angles thereto, said selector members each having a foot member cooperating with said groove of said adjusting members whereby upon movement of said adjusting members in a straight line adjustment position, pivotal movement of said selector members is provided, and indicator means provided and positioned by said adjustment members indicate a temperature setpoint on a temperature setpoint scale.

8. The invention of claim 7 wherein, said selector members are flexible to allow easy removal of said adjusting members when no external adjustment of the thermostat setpoint with the cover in place is desired.

* * * * *